(No Model.)
H. KNOWLES.
SOCKET PIPE FOR DRAINAGE, &c.
No. 462,052. Patented Oct. 27, 1891.
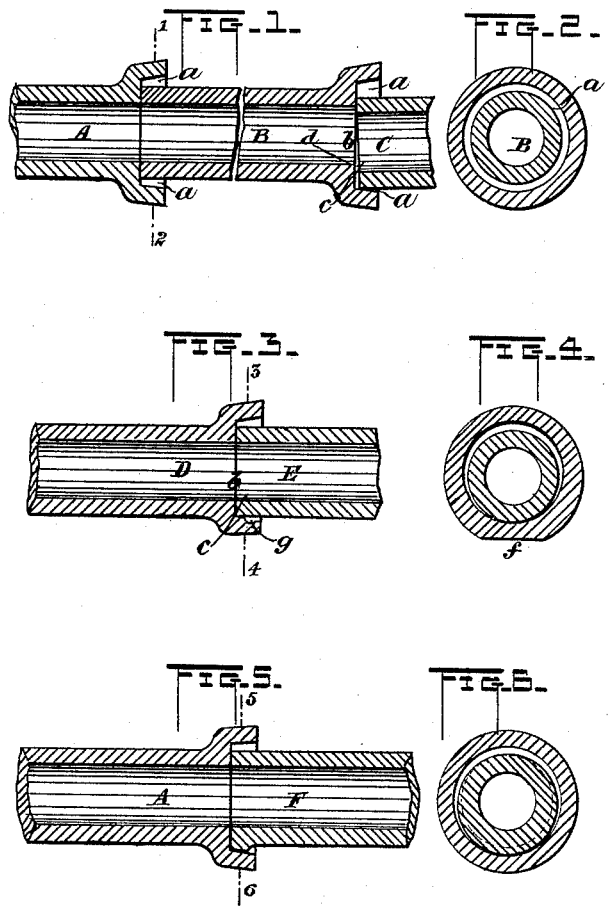
Witnesses
John Revell
Albert Popkins
Inventor
Henry Knowles
By his Attys.
Howson and Howson

UNITED STATES PATENT OFFICE.

HENRY KNOWLES, OF WOODVILLE, ENGLAND.

SOCKET-PIPE FOR DRAINAGE, &c.

SPECIFICATION forming part of Letters Patent No. 462,052, dated October 27, 1891.

Application filed August 19, 1890. Serial No. 362,402. (No model.) Patented in England February 15, 1889, No. 2,714.

*To all whom it may concern:*

Be it known that I, HENRY KNOWLES, manufacturer, a subject of the Queen of Great Britain and Ireland, and residing at the Albion Sanitary Pipe-Works, Woodville, in the county of Leicester, England, have invented certain Improvements in Socket-Pipes for Drainage or other Purposes, (for which I have obtained a patent in Great Britain, No. 2,714, dated February 15, 1889,) of which the following is a specification.

My invention relates to improvements in socket-pipes, and has for its object to give them a firmer and more even bearing when laid and to secure a true invert or alignment at the joints, and consequently throughout the length of the piping, and to lessen the difficulty of laying and jointing in making sound gas and water tight joints. It applies to all socket-pipes, but more especially to pipes made from clays, which vary in shrinkage and are liable to warp in drying and burning. To allow for this variation it is necessary to make the internal diameter of the sockets greater than the external diameter of the pipe to allow for the insertion of the spigot of one pipe into the socket of the other and to leave space for the packing material. Hitherto circular pipes have had the sockets made concentric with the pipes, and when the spigot of one pipe is placed into the socket of another in line with the pipe there is a space left underneath between the spigot and socket which allows the spigot to drop, thereby lowering the invert at the joint and forming a ledge which obstructs the free flow of the sewage or other liquids. In the case of drainage, where, owing either to the carelessness or inexperience of the workmen laying the pipes or to the use of unsuitable material for jointing, or to the difficulty of making the joint properly, or owing to the nature of the ground in which they are laid, or to the pressure of the earth on the pipes, there is a constant liability of the spigot of the pipe sinking below the interior surface of the other pipe against which it abuts, and if it does sink the flow of the sewage is thereby retarded and a lodgment is formed at the joint for the solid matter in the sewage, where it accumulates, and decomposing becomes dangerous to health. To remedy this evil and to secure a free flow of the sewage or other liquids, and to enable the pipes to be easily laid with a solid bearing and in line with each other, so that a true invert or alignment of the piping shall in all cases be maintained at the joints, I according to my invention make the socket internally eccentric to the pipe instead of concentric, as hitherto, so that the circumference of the socket at the shoulder end internally shall be in line at the base with the external circumference of the pipe and the depth at the base internally equal to the thickness of the pipe; or, in other words, I raise the socket internally at the base, so that when the spigot of one pipe is placed in the socket of another it rests on the said socket and has a solid bearing thereon which maintains it in line with the other pipe, and thereby forms and maintains a true invert at the joints, and consequently a true alignment of the pipes, even though the pipes may through any cause be disturbed. I also prefer to increase the thickness of the socket gradually toward the base and to make the base flat externally to secure a better and more solid bearing, and thereby lessen the liability of the pipes being disturbed or moved out of line; or as an equivalent of the foregoing I make the lower half of the spigot end thicker than the other part of the pipe for use with ordinary sockets, the thickness at the base of the spigot end being equal to the depth of the shoulder of the pipe against which it abuts, so that when resting in position the pipes are in true line with each other.

The socket internally and the spigot externally are preferably roughened in the usual manner, and the socket or spigot, or both, may have a groove or grooves therein for holding the jointing material, which may be of any suitable material—such, for instance, as cement, clay, or a combination of these with or without tarred gasket. The kind of packing material used will depend mainly on the state of the ground in which the pipes have to be laid. The upper part of the socket may have one or more openings for pouring in liquid cement or other suitable material to fill the space within the socket to secure a gas and water tight joint.

In order that my said invention may be fully understood, I shall now proceed more particularly to describe the same, and for that purpose shall refer to the several figures on the annexed sheet of drawings, the same letters of reference indicating corresponding parts in all the figures.

Figure 1 is a longitudinal section showing parts of three ordinary socket-pipes A, B, and C, made as has hitherto been customary, the pipes having at the joint the annular space $a\ a$ within the socket when the spigot of one pipe is inserted in the socket of the pipe next it, it being intended that they shall be held in position concentric with each other, as shown, at the joint between the pipes A and B in Figs. 1 and 2, the latter figure being a transverse section on the line 1 2 of Fig. 1. At the joint $b$ of the pipes B C the spigot of C is shown to rest on the socket of B, thus opening the joint and lowering the invert at $c$ and causing the ledge or shoulder $d$ at the joint, which obstructs the flow of the matter passing through the pipes, and in the case of sewage forms a lodgment for the solid matter which gradually accumulates, and where the fall is slight and with little or no flush will eventually choke and stop the drain.

Fig. 3 is a longitudinal section, and Fig. 4 is a transverse section on the line 3 4, Fig. 3, of a socket-pipe constructed according to my invention, showing the spigot of the pipe E inserted in the improved socket of the pipe D and with its extreme outer end against the shoulder $d$, resting on the socket at the base and forming a true invert or alignment at $c$ of the joint $b$, which will be maintained in consequence of the solid bearing, and the outer face of the socket being flattened at the base, as shown at $f$ in Fig. 4, will maintain the pipes solid on the bed, and they will be less liable to disturbance than when made in the ordinary manner, as in Figs. 1 and 2. In Fig. 3 a groove $g$ is shown in the socket at the base internally for the jointing material to fill the lower half of the socket.

Fig. 5 is a longitudinal section, and Fig. 6 a transverse section on the line 5, 6, Fig. 5, showing a modification of my improved pipe, wherein there is a thickened part at the base or lower part of the spigot of the pipe F, where it rests on the ordinary socket of the pipe A, and thereby holds the pipe in position and securing a true invert at the joint, as in the case of Figs. 3 and 4.

When making the joints of my improved pipes, I prefer to proceed as follows: I first press a roll or wad of clay or other suitable material around the socket internally at the shoulder. I then place a fillet of stiff clay or strong cement or other suitable material in the lower half of the socket, and then I insert the spigot of the next pipe, lifting it so as to enter the socket at the upper part to avoid forcing forward the cement in the lower part. When the spigot is pressed up to the shoulder of the socket, the roll of clay at the shoulder is forced into the joint, which it closes and prevents the cement entering the pipes. The spigot, having been forced home, is then pressed down on the fillet of cement, forcing it to fill up and make the joint water-tight at the lower half of the socket, where the leakage generally occurs through the difficulty of filling the joints properly underneath. The upper half of the socket may then be filled by ramming in packing material, or liquid cement may be forced in from openings in the top of socket; or, if preferred, the whole space in the socket may be filled by pouring in liquid cement or other suitable material. It may be advisable in some cases to use one or more strands of tarred gasket. When the joint is being made by filling with liquid cement a rope should be placed round the pipe at the mouth of the socket to prevent the cement from running out, and the rope should remain while other joints are being made in similar manner till the cement is set, when the ropes can be removed and the joints finished in the usual manner.

The mode of making the joints and the material to be used will vary with circumstances.

The invention is applicable to all socket-pipes, round, oval, or of other shape, and having either whole or half sockets, or for half-pipes with sockets.

Having now particularly described and ascertained the nature of my said invention and in what manner the same is to be performed, I declare that what I claim is—

1. A pipe-joint consisting of a spigot and a socket, the internal diameter of which is greater than the external diameter of the spigot throughout, an eccentric or thickened part at the lower side close to the shoulder of the socket at its base only and supporting the extreme outer end of the spigot against the shoulder of the socket when the piping is in alignment, substantially as and for the purposes set forth.

2. A pipe-joint consisting of a socket, the lower external part of which is flattened, and a spigot having its extreme outer end resting upon and supported by the lower part of the interior of the socket at its base only and against the shoulder of the socket when the piping is in alignment, the internal diameter of the socket being greater than the external diameter of the spigot throughout, all substantially as and for the purposes set forth.

3. A pipe with a socket having its internal diameter eccentric to the pipe at the base closely adjacent to the shoulder, whereby, when the spigot end of the next pipe abuts against the shoulder of the socket to place the internal surfaces of the piping in a direct line, the extreme outer end of the spigot rests upon and is supported by the lower internal part of the socket at its base, substantially as set forth.

In testimony whereof I have signed my name to this specification in the presence of two subscribing witnesses.

HENRY KNOWLES.

Witnesses:
 EDWD. GEO. DAVIES,
 CHAS. MILLS,
*Both of 47 Lincoln's Inn Fields, London, W. C.*